(12) United States Patent
Sugita et al.

(10) Patent No.: US 11,602,820 B2
(45) Date of Patent: Mar. 14, 2023

(54) OPTICAL CONNECTOR POLISHING JIG

(71) Applicant: NTT Advanced Technology Corporation, Kawasaki (JP)

(72) Inventors: Naoki Sugita, Kawasaki (JP); Toshinori Kimura, Kawasaki (JP); Masaaki Konishi, Kawasaki (JP); Kenji Aoki, Kawasaki (JP)

(73) Assignee: NTT ADVANCED TECHNOLOGY CORPORATION, Kawasaki (JP)

( * ) Notice: Subject to any disclaimer, the term of this patent is extended or adjusted under 35 U.S.C. 154(b) by 0 days.

(21) Appl. No.: 16/978,321

(22) PCT Filed: Mar. 6, 2018

(86) PCT No.: PCT/JP2018/008478
§ 371 (c)(1),
(2) Date: Sep. 4, 2020

(87) PCT Pub. No.: WO2019/171451
PCT Pub. Date: Sep. 12, 2019

(65) Prior Publication Data
US 2021/0001444 A1 Jan. 7, 2021

(51) Int. Cl.
*B24B 41/06* (2012.01)
*G02B 6/38* (2006.01)

(52) U.S. Cl.
CPC ............ *B24B 41/06* (2013.01); *G02B 6/3863* (2013.01)

(58) Field of Classification Search
CPC ....... B24B 19/00; B24B 19/226; B24B 19/22; B24B 37/27; B24B 37/34; B24B 41/06;
(Continued)

(56) References Cited

U.S. PATENT DOCUMENTS 4,693,035 A 9/1987 Doyle
5,584,746 A 12/1996 Tanaka et al.
(Continued)

FOREIGN PATENT DOCUMENTS

CN 1868665 A 11/2006
CN 201979398 U 9/2011
(Continued)

OTHER PUBLICATIONS

International Preliminary Report on Patentability dated Sep. 8, 2020, issued in PCT Application No. PCT/JP2018/008478, filed Mar. 6, 2018.

*Primary Examiner* — Joseph J Hail
*Assistant Examiner* — Arman Milanian
(74) *Attorney, Agent, or Firm* — Workman Nydegger

(57) ABSTRACT

In a polishing apparatus an optical connector polishing jig holds the MT ferrule provided at the connection end portion of the optical connector, the optical connector polishing jig includes: a cylinder base; a cylinder shaft held on the cylinder base to be capable of moving in the up-down direction; and a set block connected to an end of the cylinder shaft and having a hole into which the MT ferrule is inserted and in which fixing means for adjusting the pressing force and fixing the MT ferrule is inserted, and a surface of the fixing means that comes into contact with the MT ferrule has a protrusion that partially protrudes to apply a pressing force to the MT ferrule such that when the MT ferrule is fixed, an end surface of the MT ferrule is slightly deformed and a center portion of the end surface in a longitudinal direction swells.

7 Claims, 21 Drawing Sheets

(58) Field of Classification Search
CPC ... B24B 41/067; B24B 41/068; G02B 6/3863; G02B 6/3885; G02B 6/389; G02B 6/46; Y10T 29/4984
USPC .......... 269/287; 385/78, 81, 83, 85; 451/10, 451/11, 271, 41, 909, 272, 278, 279, 415, 451/365, 438
See application file for complete search history.

(56) References Cited

U.S. PATENT DOCUMENTS

| | | | | |
|---|---|---|---|---|
| 6,102,785 | A | * | 8/2000 | Chandler ................ B24B 49/16 451/271 |
| 6,808,444 | B1 | * | 10/2004 | Kuprin ................ B24B 19/226 451/292 |
| 6,979,255 | B2 | * | 12/2005 | Yamada ................ B24B 19/226 269/287 |
| 7,409,135 | B1 | | 8/2008 | Beldycki |
| 7,738,760 | B2 | | 6/2010 | Fredrickson et al. |
| 2003/0210871 | A1 | * | 11/2003 | Rosson ................ G02B 6/3881 385/60 |
| 2003/0227634 | A1 | * | 12/2003 | Kobayashi ........... G02B 6/3863 356/508 |
| 2004/0110455 | A1 | | 6/2004 | Yamada et al. |
| 2005/0148289 | A1 | | 7/2005 | Mikolas et al. |
| 2013/0331008 | A1 | * | 12/2013 | Andou ................ B24B 19/226 451/164 |
| 2018/0236626 | A1 | | 8/2018 | Shibutani |
| 2019/0030681 | A1 | | 1/2019 | Shibutani |

FOREIGN PATENT DOCUMENTS

| | | | | |
|---|---|---|---|---|
| CN | 102756329 | A | | 10/2012 |
| CN | 203600042 | U | * | 5/2014 ............ B24B 49/16 |
| CN | 203600042 | U | | 5/2014 |
| JP | S61-265255 | A | | 11/1986 |
| JP | H05-315306 | A | | 11/1993 |
| JP | H07-112364 | A | | 5/1995 |
| JP | H09-001450 | A | | 1/1997 |
| JP | 2000-254850 | A | | 9/2000 |
| JP | 2000-343398 | A | | 12/2000 |
| JP | 2002-254306 | A | | 9/2002 |
| JP | 2003-311596 | A | | 11/2003 |
| JP | 2004-017221 | A | | 1/2004 |
| JP | 2004012931 | A | | 1/2004 |
| JP | 2004-181608 | A | | 7/2004 |
| JP | 2017-170605 | A | | 9/2017 |
| JP | 62-63291 | B1 | | 12/2017 |

* cited by examiner

OPTICAL CONNECTOR POLISHING JIG

TECHNICAL FIELD

The present invention relates to optical connector polishing jigs and particularly to an optical connector polishing jig used in a polishing apparatus for polishing optical connectors having MT ferrules.

BACKGROUND ART

In recent years, in order to support large capacity optical networks, use of multi-fiber optical fiber has spread, including for connections inside servers used at data centers or the like. In such a background, optical connectors for multi-fiber optical fiber have also been gaining attention instead of ones for single-fiber optical fiber.

FIG. 1 is a diagram illustrating an example of an optical connector for connecting multi-fiber optical fiber. In the optical connector 1, multiple optical fibers 10 covered with jackets are inserted into an MT ferrule 11 with the optical fibers exposed at their ends. The description in the present specification is based on the assumption that the length direction of the optical fibers inserted into the MT ferrule 11 is called the longitudinal direction, and the width direction of the MT ferrule 11 which is orthogonal to the longitudinal direction is called the lateral direction, as illustrated in FIG. 1. The MT ferrule 11 has a brim 11a formed wider than the other portions and an opening 11b for inserting glue. The inside of the MT ferrule 11 is filled with glue for fixing the optical fibers 10 inserted into the MT ferrule 11 to the MT ferrule 11, which is injected from the glue injection opening 11b. The ends of the optical fibers 10 inserted inside and the injected glue protrude from at the end surface 11c of the MT ferrule 11. Since the end surface of the MT ferrule 11 in this state, into which the optical fibers 10 are inserted and which is filled with glue, is not suitable for optical connection, it is desirable to polish the end surface to improve the precision of the connection.

For apparatuses for polishing the end surface of the MT ferrule in this state, there are known polishing apparatuses. Such polishing apparatuses include a polishing jig that holds the MT ferrule with its end surface facing down and a polishing plate that, for example, rotates under the polishing jig to polish the end surface of the MT ferrule. The polishing plate is driven in the state where the MT ferrule is inserted and fixed to a specified position in the polishing jig, and the end surface of the MT ferrule can be polished. There are several known techniques about how to hold the MT ferrule in the holding tool in such polishing apparatuses.

Patent literature 1 discloses a configuration in which the MT ferrule is held by pressing the MT optical connector against a side wall of a housing slot inner surface in the lateral direction with a pushing block to fix the MT optical connector. The end surface of the pushing block on the side that pushes the MT optical connector is formed flat.

Patent literature 2 discloses a holding apparatus in which a support wall is provided on a side opposite to a seating portion of a ferrule insertion hole, a holding portion is provided at a front portion facing the support wall, and a holding member having a slope having a down grade toward the back is slidably arranged on the seating portion. In this holding apparatus, a rod member arranged on the slope is pressed downward, pushing the holding member forward, and thus the ferrule is fixed.

Patent literature 3 discloses a method of fixing the optical connector in which an optical connector is inserted from above into a hole one side of which in the lateral direction is open, a clamp pad having at its upper end a flange protrusion for pushing the optical connector from above is brought into contact with the optical connector from the lateral direction, and a clamp screw presses the clamp pad obliquely from above to fix the optical connector.

Patent literature 4 discloses a polishing jig in which a base having an insertion hole into which the ferrule of the optical connector is inserted is provided with a fixation piece for fixing the ferrule, and the fixation piece is fixed with a rotation rod. When the rotation rod rotates, the fixation piece moves to a position for fixing the ferrule.

CITATION LIST

Patent Literature

PTL 1: Japanese Patent Laid-Open No. 2002-254306
PTL 2: Japanese Patent Laid-Open No. 2004-181608
PTL 3: U.S. Pat. No. 7,738,760
PTL 4: Japanese Patent Laid-Open No. 2017-170605

SUMMARY OF INVENTION

Technical Problem

In general, in the case of connecting multi-fiber optical fiber, it is important for connection quality that the positions of the ends of the optical fibers to be connected are uniform. It is because if the positions are not uniform, it causes a problem that only fibers protruding more are brought into contact, and that optical fibers protruding less are not brought into contact sufficiently with each other. Hence it is important to make the ferrule end-surface 11c flat in order to make the positions of the ends of the optical fibers uniform.

The above conventional polishing apparatuses have made it possible to obtain a certain degree of flatness for the end surface of the MT ferrule by polishing.

However, although the flatness of the MT ferrule end-surface requires nanometer-level precision to achieve optical connections having favorable optical characteristics (in terms of connection loss and reflection attenuation), it is actually difficult for any of the polishing apparatuses using the above holding tools to finishes the end surface such that the finished end surface has a high flatness with nanometer-level precision.

Hence, there has been a problem that in the case where the flatness of the end surface of the MT ferrule is low, the end surfaces of multiple optical fibers positioned side by side are ununiform, making some optical connections insufficient, and as a result, favorable optical connections cannot be achieved.

The present invention has been made in light of the problem that conventional apparatuses have, and an object of the present invention is to provide an optical connector polishing jig for a polishing apparatus that provides polishing for achieving a high flatness of the MT ferrule end-surface.

Solution to Problem

To solve the above problem, an aspect of the invention according to a first embodiment is an optical connector polishing jig that holds an MT ferrule of a multi-fiber optical fiber connector in a polishing apparatus for polishing an optical connector, characterized in that the optical connector polishing jig includes fixing means for holding the MT ferrule, and a surface of the fixing means that comes into contact with the MT ferrule has a protrusion that partially protrudes to apply a pressing force to the MT ferrule such that when the MT ferrule is fixed, an end surface of the MT ferrule is slightly deformed and a center portion of the end surface in a longitudinal direction swells.

In an aspect of the invention according to a first aspect of the first embodiment, the fixing means includes an opening into which the MT ferrule is inserted, an inner piece fitted in the opening to be adjacent to the MT ferrule, and a screw that presses the inner piece against the MT ferrule for adjusting the pressing force.

In an aspect of the invention according to a second aspect of the first embodiment, a protrusion formed on a surface of the inner piece that comes into contact with the MT ferrule has any of a center round shape in which only a portion along the center portion protrudes to form a round shape, a T-shape in which a surface protrudes to form the shape of a letter T, and a round shape in which a round shape is formed in whole, such that the pressure applied to a portion along the center portion is larger than the pressure applied to the other portions.

In an aspect of the invention according to a third aspect of the first embodiment, the fixing means includes a lever for pressing a brim of the MT ferrule to an adjoining surface of the opening when the inner piece is pressed to fix the MT ferrule.

In an aspect of the invention according to a fourth aspect of the first embodiment, the adjoining surface of the opening with which the brim of the MT ferrule comes into contact is tilted according to a finished tilt angle of the end surface of the MT ferrule.

In an aspect of the invention according to a fifth aspect of the first embodiment, the polishing apparatus polishes the optical connector by a polishing table horizontally moving relative to the end surface of the MT ferrule, the optical connector polishing jig further includes a housing and a shaft held by the housing such that the shaft is capable of reciprocating and having one end connected to the fixing means, the housing has a cavity receiving the shaft and a spring that expands and contracts along the shaft, and the shaft reciprocates such that in a case where a force that the MT ferrule fixed to the fixing means receives from the polishing table becomes greater than or equal to a certain force, the spring contracts and the shaft moves in a direction toward the housing, and in a case where the force that the MT ferrule fixed to the fixing means receives from the polishing table becomes smaller than the certain force, the spring expands and the shaft moves in a direction away from the housing to a fixed position.

In an aspect of the invention according to a sixth aspect of the first embodiment, the optical connector polishing jig further includes an anti-rotation shaft that is provided on the fixing means to be adjacent to the shaft and to extend in the same direction as the shaft extends and is fitted into the housing.

DESCRIPTION OF EMBODIMENTS

Hereinafter, an embodiment of the present invention will be described in detail.

Figure 1:
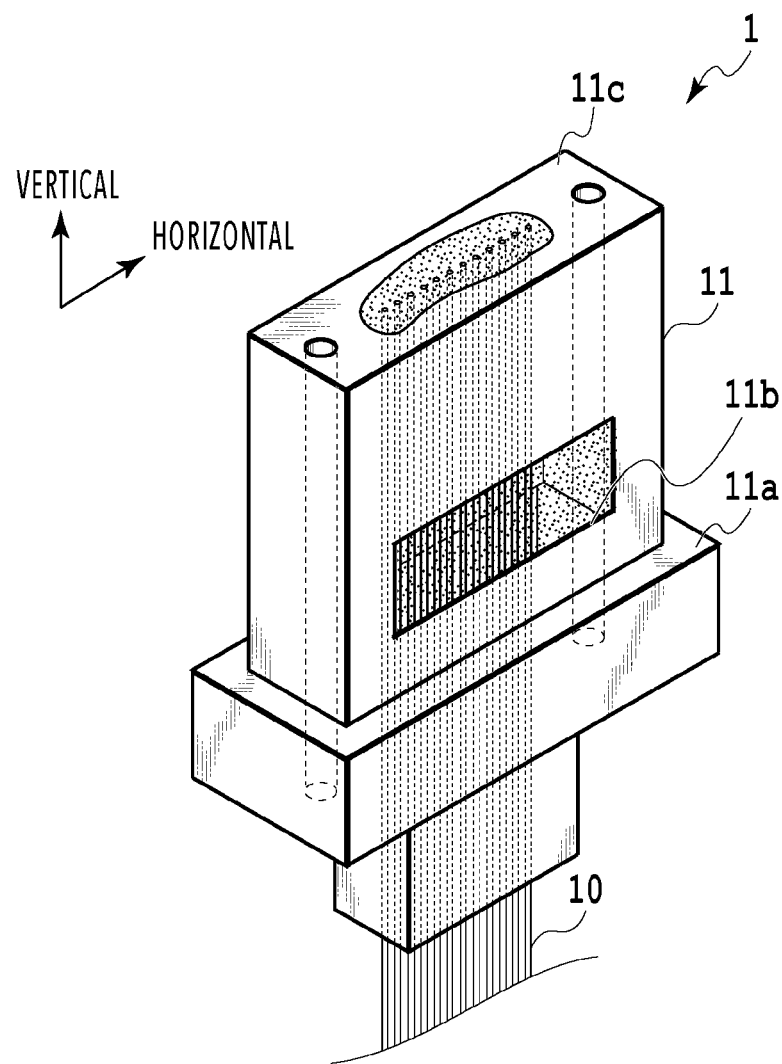
FIG. 1 is a perspective view of an example of an optical connector for connecting multi-fiber optical fibers.
Figure 2:
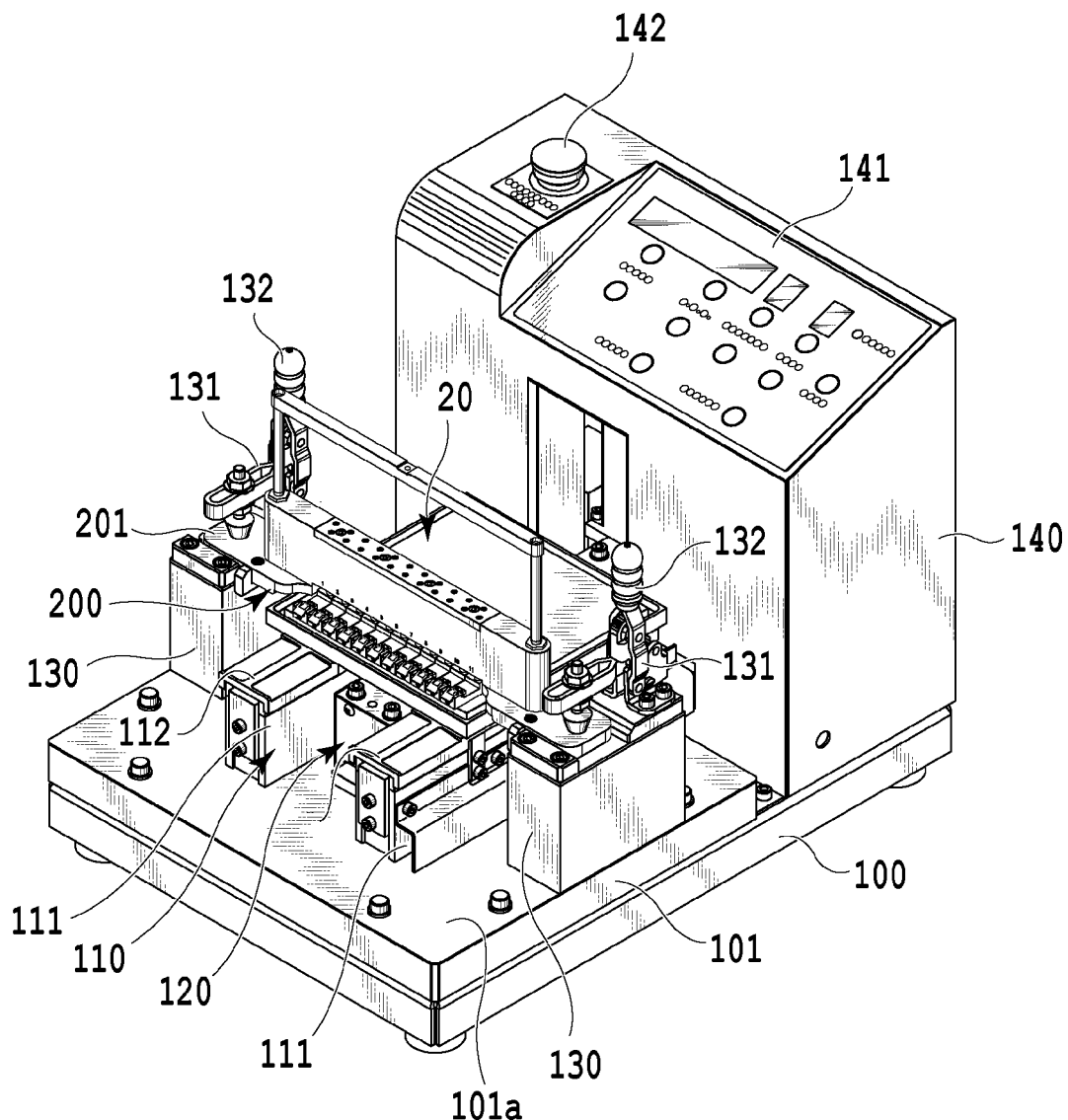
FIG. 2 is a perspective view of the outer appearance of a polishing apparatus on which a polishing jig according to the present embodiment is mounted.

FIG. 2 is a perspective view of the outer appearance of a polishing apparatus on which a polishing jig according to the present embodiment is mounted. The polishing apparatus according to the present embodiment is used for polishing the connection end surface 11c of a ferrule (MT ferrule, which is hereinafter simply referred to as a ferrule) 11 housed in an optical connector 1 as illustrated in FIG. 1. This polishing apparatus includes a base 101, a polishing table 20 having a polishing surface for polishing the connection end surface 11c of the ferrule 11, a support mechanism 110 that supports the polishing table 20, a driving mechanism 120 that moves the polishing table 20 in a circular motion and in a reciprocating linear motion, a polishing jig 200 which is a work holder for holding multiple optical connectors 1, and support bases 130 for supporting the polishing jig 200. Here, the circular motion means moving the polishing table 20 such that the movement paths of all the points on the polishing table 20 draw a circle with a specified radius.

The base 101 is placed on a work floor via a pedestal 100 in which a rubber vibration isolator is embedded. The base 101 is a plate-shaped member having a flat mounting surface (reference surface) 101a, for example, with long and short sides of 300 mm×250 mm. The base 101 may employ a stone surface plate which is excellent in wear resistance and corrosion resistance and is deformed less by heat than general metals such as cast steel and aluminum alloys. Although the flatness necessary for the mounting surface 101a of the base 101 depends on the number and the arrangement interval of optical connectors 1 that are polished at the same time, in general it only needs a precision better than class 2 of JIS (Japanese Industrial Standards). If the linear expansion coefficient of the material composing the base 101 is $1.1 \times 10^{-5}/°$ C. or less, metals such as cast iron, stainless steel SUS430, 50% nickel steel, or ordinary steel may be employed for the base 101. Note that the pedestal 100 is provided with a cover 140 for covering a motor and a power transmission system for the motor, located adjacent to the base 101, and this cover 140 has, at its upper portion, an operation unit 141 including various buttons and indicator lamps and an emergency stop switch 142.

On the mounting surface 101a of the base 101, the polishing jig 200 is held by the support bases 130 at a certain height position. The leg portions 201 of the polishing jig 200 are clamped by toggle clamps 131 on the support bases 130, and the polishing jig 200 is fixed at certain positions on the support bases 130 by pulling levers 132. The polishing table 20 moves being driven by the driving mechanism 120 along guide members 112 provided on the upper surfaces of support members 111 of the support mechanism 110. In other words, the polishing table 20 which is supported and driven by the support mechanism 110 and the driving mechanism 120 moves relative to the polishing jig 200 in a horizontal direction. This movement of the polishing table 20 relative to this polishing jig 200 polishes the connection end surfaces 11c of the ferrules 11 of the optical connectors 1 held by the polishing jig 200.

Figure 3:
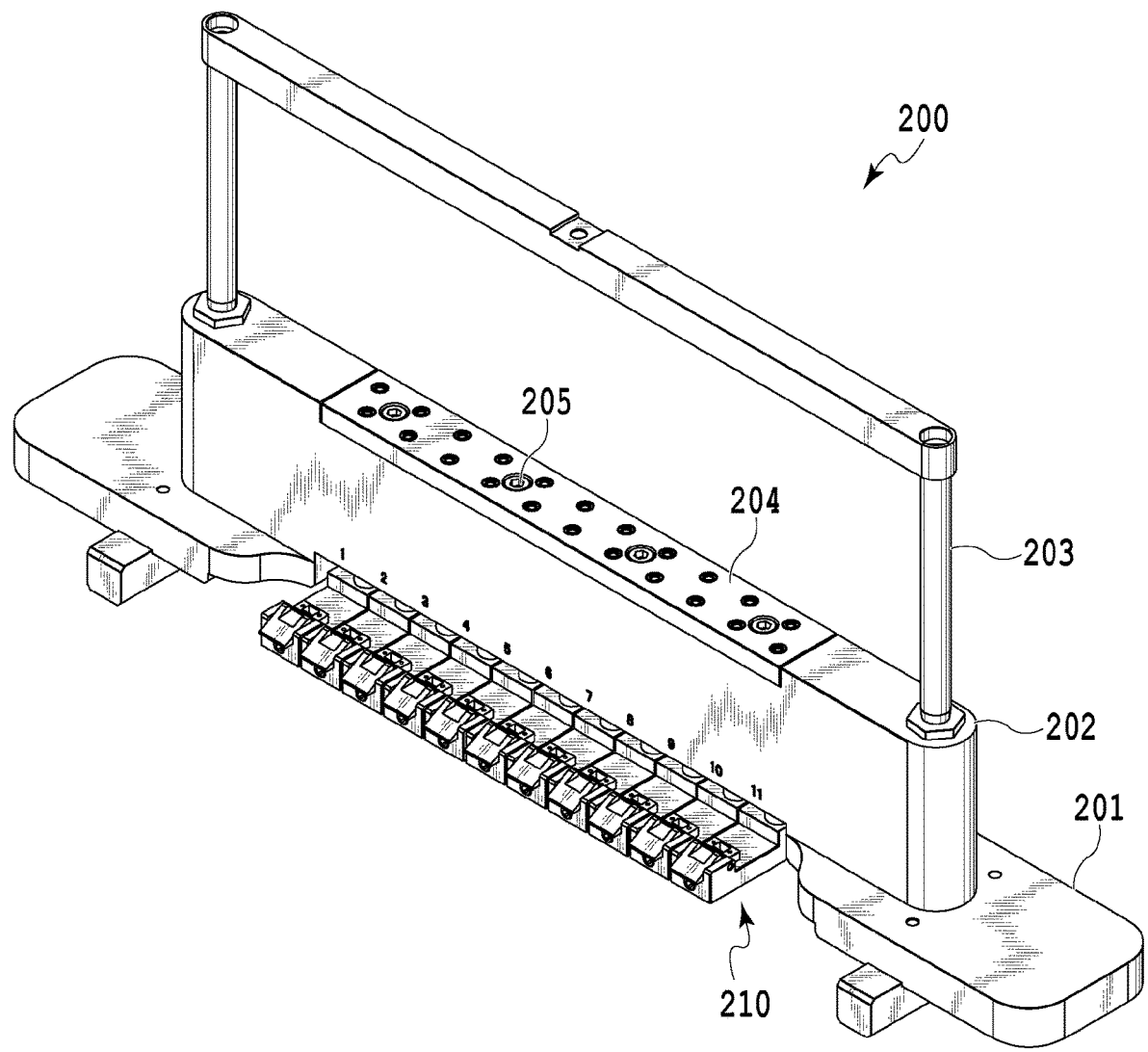
FIG. 3 is a perspective view of the outer appearance of the polishing jig from an upper direction.
Figure 4:
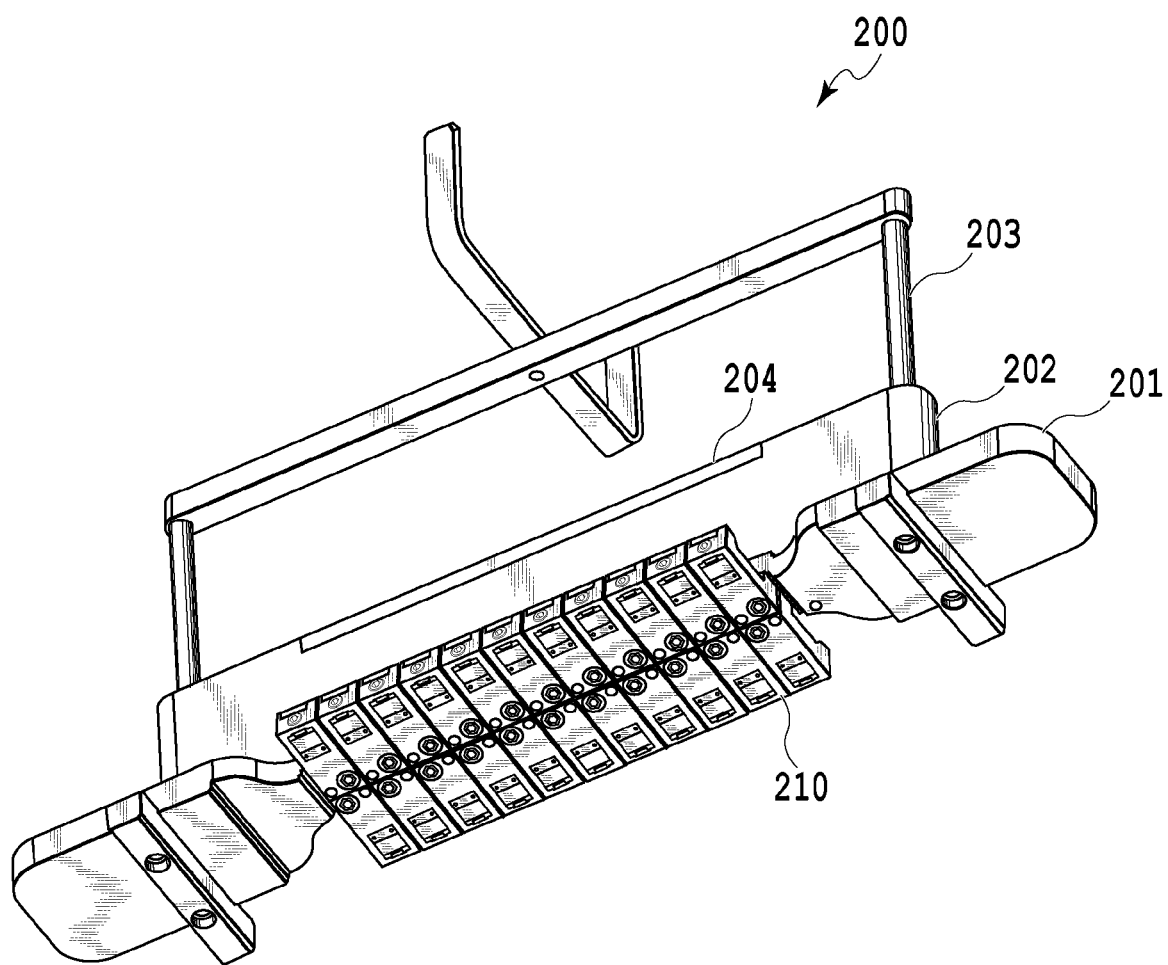
FIG. 4 is a perspective view of the outer appearance of the polishing jig from a bottom face direction.
Figure 5:
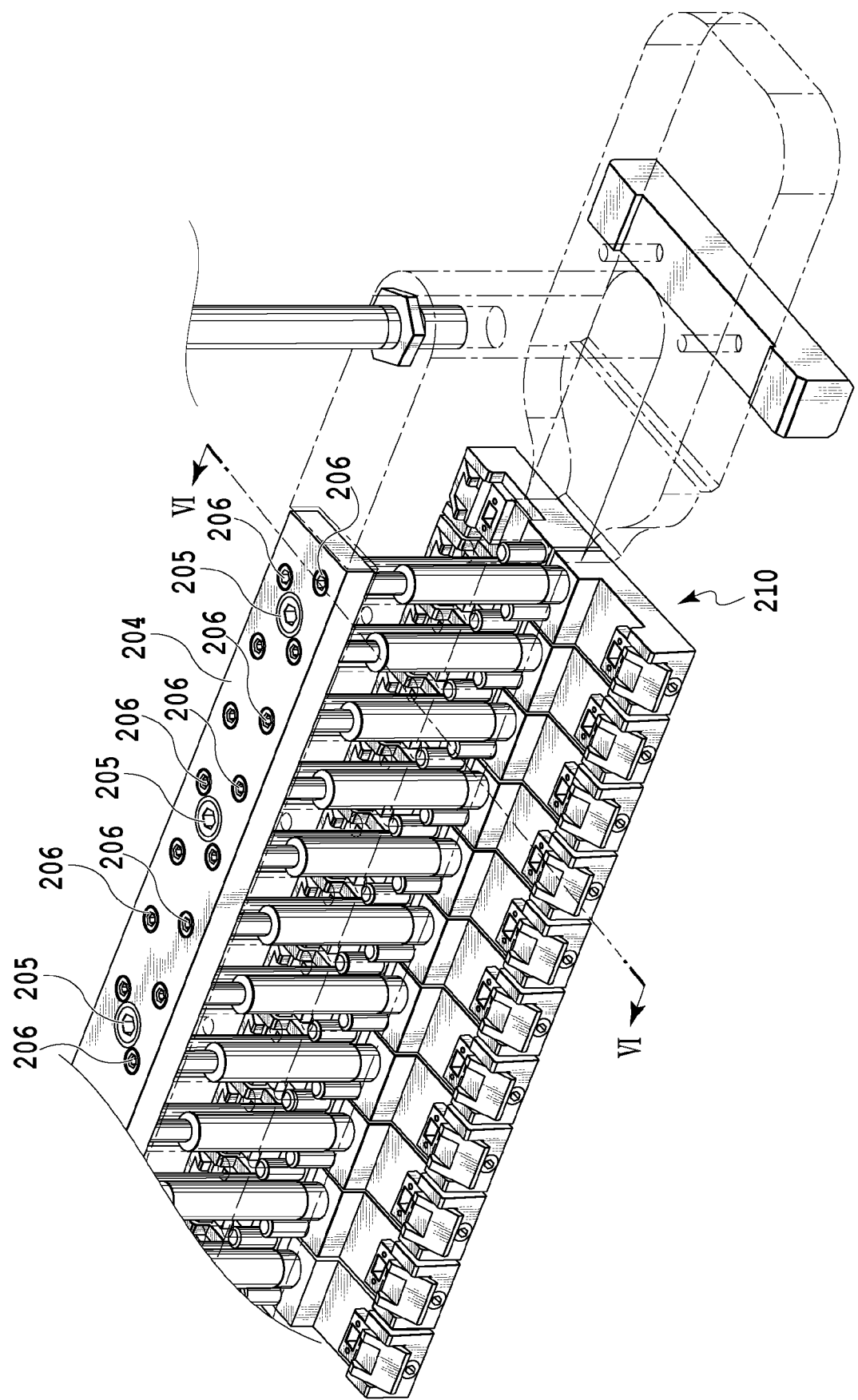
FIG. 5 is a perspective view of a fixation plate attached to the upper surface of a cylinder base and an attachment housed in the cylinder base.
Figure 6:
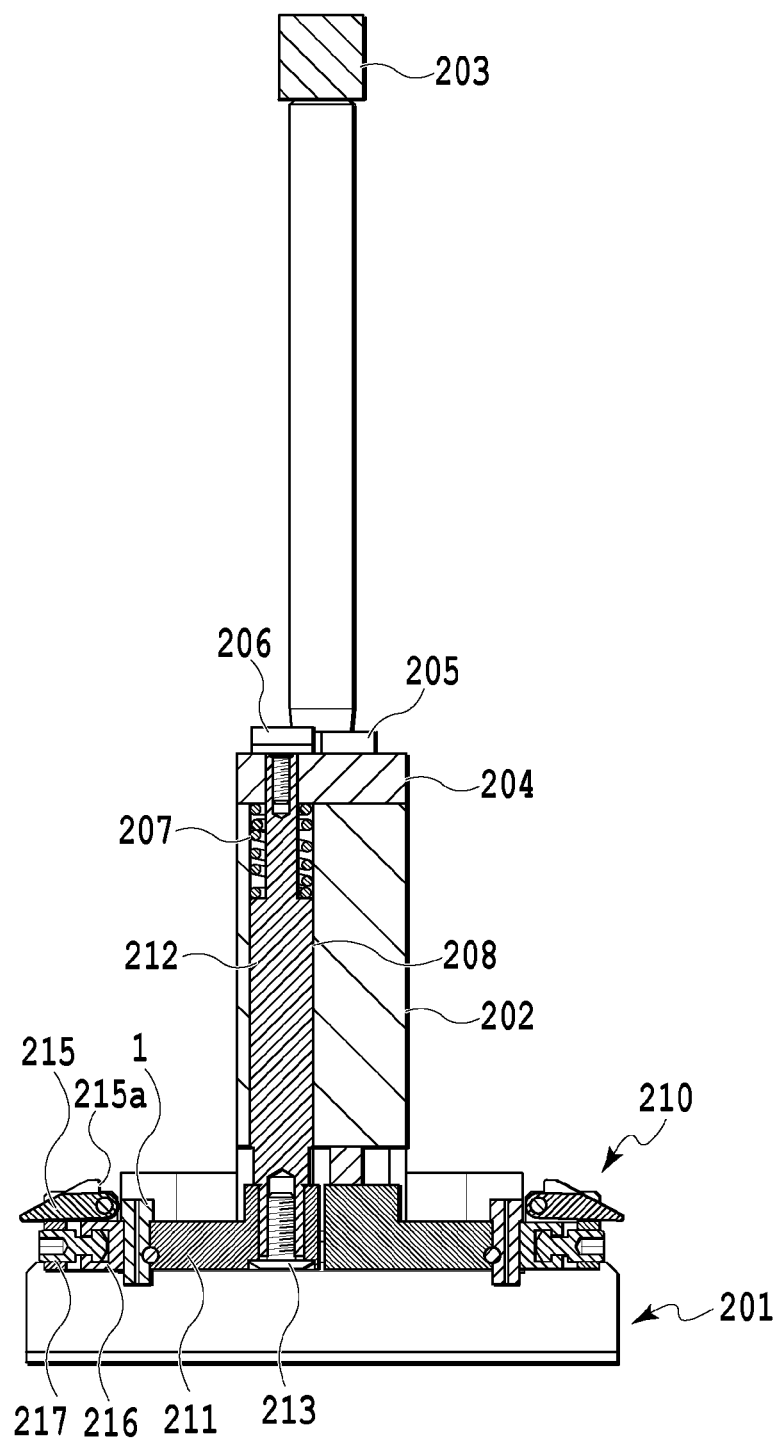
FIG. 6 is a cross-sectional view of the polishing jig in FIG. 5 taken along line VI-VI.

FIG. 3 is a perspective view of the outer appearance of the polishing jig 200 from an upper direction, FIG. 4 is a perspective view the outer appearance of the polishing jig 200 from a bottom face direction, and FIG. 5 is a perspective view of a fixation plate 204 attached to the upper surface of a cylinder base (housing) 202 and attachments 210 housed in the cylinder base 202. FIG. 6 is a cross-sectional view of the polishing jig 200 in FIG. 5 taken along line VI-VI. The polishing jig 200 has the cylinder base 202 which is laterally elongated and the attachments 210 for fixing the ferrules 11 of the optical connectors 1 to the cylinder base 202. Both ends of the cylinder base 202 in the longitudinal direction each have a leg portion 201 at its lower portion for fixing the cylinder base 202 to the support bases 130 of the polishing apparatus and a handle 203 at its upper portion. The cylinder base 202 has multiple cavities 208 that pass through from the bottom surface, and an attachment 210 is fitted into each of these multiple cavities 208 from the bottom surface of the cylinder base 202. On the upper surface of the cylinder base 202 is the fixation plate 204 which has holes corresponding to the multiple cavities, and the fixation plate 204 is fixed to the cylinder base 202 using fixing means such as screws 205 from above.

The attachment 210 has a configuration in which a cylinder shaft (shaft) 212 is connected to a set block 211 with a bolt 213 such that the cylinder shaft 212 extends vertically. The cylinder shaft 212 has a two-stage structure having a small diameter portion and a large diameter portion, and the upper end of the small diameter portion is connected to a screw 206. Around the small diameter portion of the cylinder shaft 212 is fitted a spring 207, which is held between the lower surface of the fixation plate 204 and a step surface between the small diameter portion and the large diameter portion of the cylinder shaft 212.

When the attachment 210 is pushed up, and the pushing force exceeds the elastic force of the spring 207, the spring 207 contracts, and the screw 206 moves up together with the cylinder shaft 212. When the force in the upper direction becomes smaller than the elastic force of the spring 207, the spring 207 expands until the upper surface of the fixation plate 204 and the screw 206 come into contact with each other. Thus, the cylinder shaft 212 can reciprocate within limits, inside the cavity 208 of the cylinder base 202.

Figure 7:
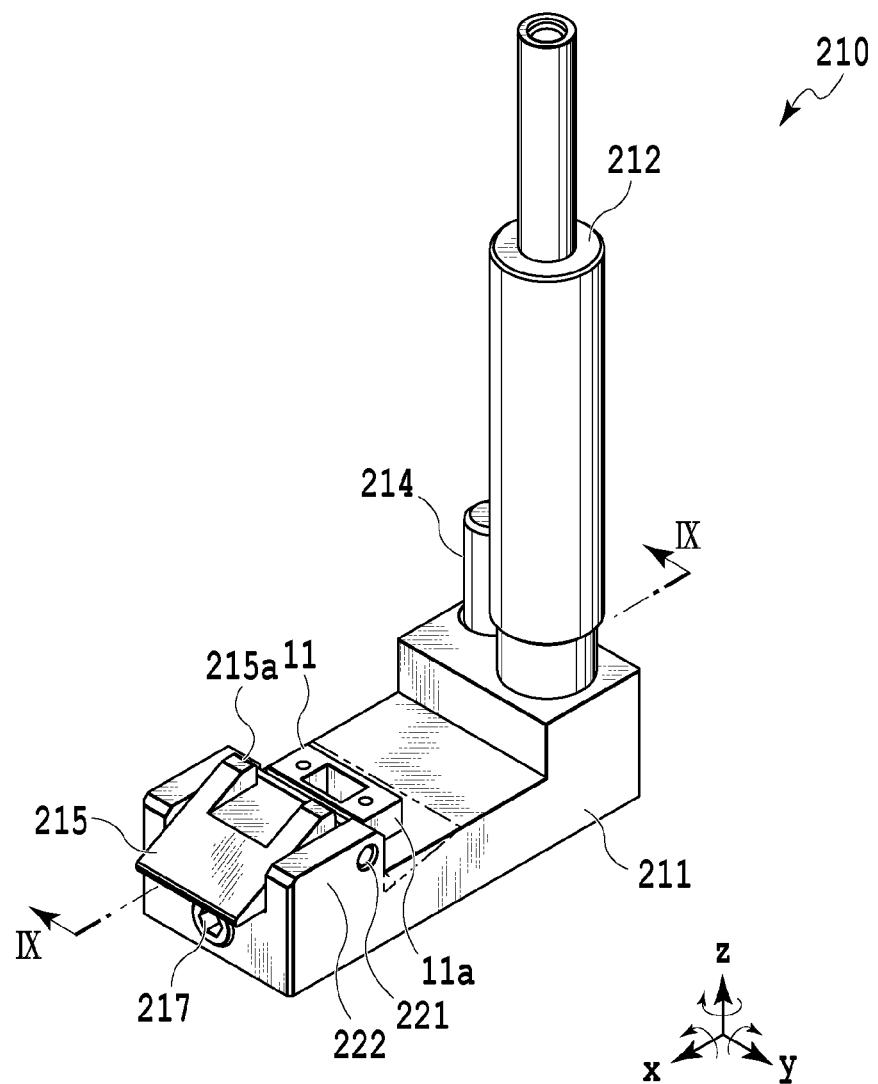
FIG. 7 is a perspective view of the outer appearance of the attachment from a top face direction.
Figure 8:
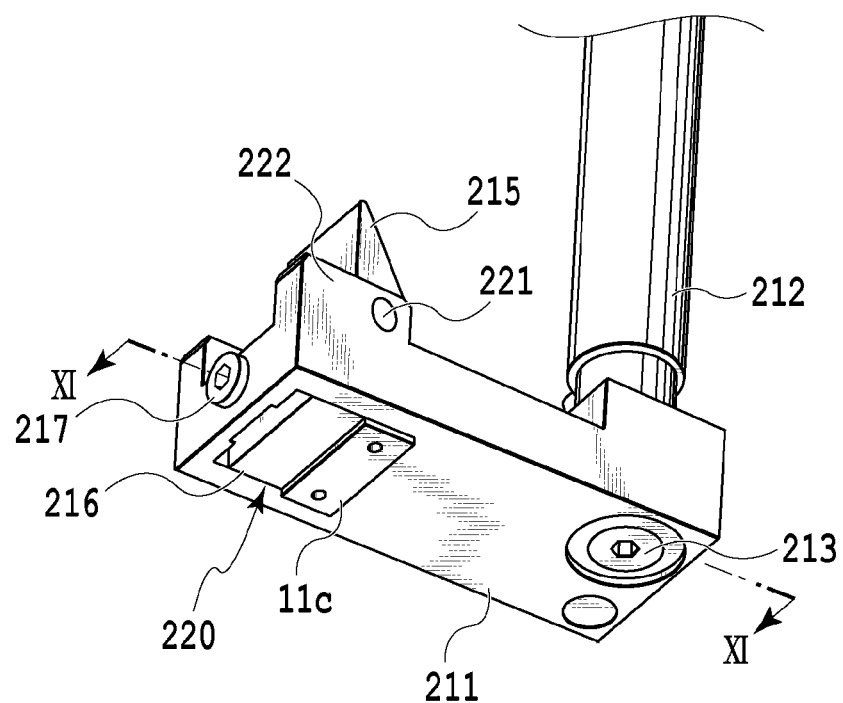
FIG. 8 is a perspective view of the outer appearance of the attachment from a bottom face direction.

FIGS. 7 and 8 are perspective views of the outer appearance of the attachment 210. FIG. 7 illustrates the state where a lever 215 is lowered, and FIG. 8 illustrates the state where the lever 215 is raised. The set block 211 further has an anti-rotation (yawing) shaft 214 attached to extend vertically as with the cylinder shaft 212. The anti-rotation shaft 214 is also inserted into the cylinder base 202 to prevent the attachment 210 from rotating relative to the cylinder base 202 (in the yawing direction).

The set block 211 has a rectangular hole (opening) 220 that passes through from the upper surface to the lower surface and through which the ferrule 11 of the optical connector 1 can be inserted. The ferrule 11 is inserted with the ferrule end-surface 11c facing down from the upper surface side of the set block 211. On both sides of the rectangular hole 220 in the set block 211, wall portions 222 are formed partially. The wall portions 222 holds a rotation shaft 221 for rotatably supporting the lever 215 on the set block 211. The lever 215 rotates on the rotation shaft 221 such that a pushing end portion 215a moves toward the rectangular hole 220 (in the pitching direction).

Inside the rectangular hole 220 in the set block 211 are provided a rectangular inner piece 216 for fixing the optical connector 1 to the set block 211 by pressing the ferrule 11 to a side wall of the rectangular hole 220 and a screw 217 for adjusting the pressing force of the rectangular inner piece 216.

FIGS. 9 to 12 are diagrams for explaining the first to fourth steps for fixing the optical connector 1 to the set block 211 of the attachment 210. In FIGS. 9 to 12, some parts of the attachment 210 are illustrated as cross-sectional diagrams. With reference to FIGS. 7 to 12, a method of fixing the optical connector 1 to the set block 211 of the attachment 210 will be described.

Figure 9:
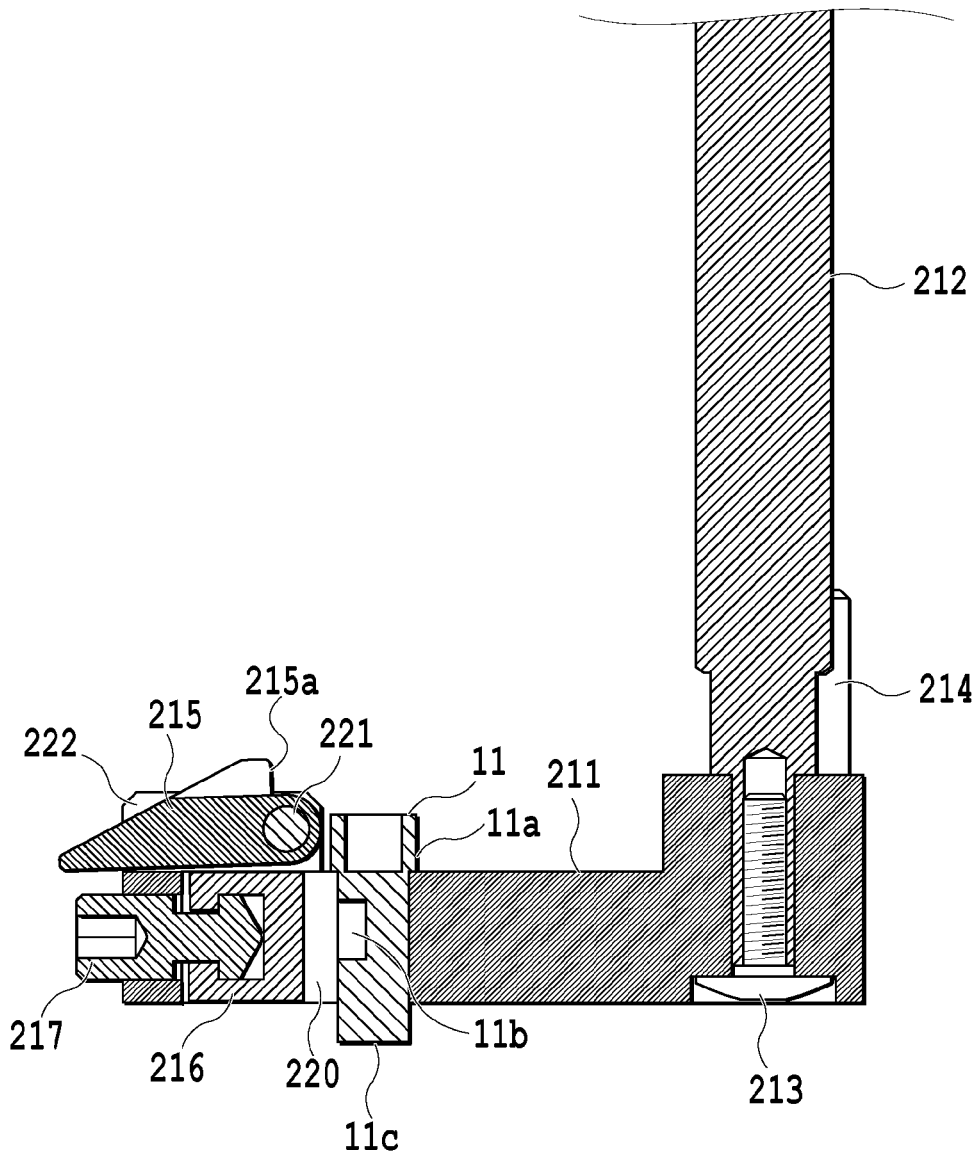
FIG. 9 is a diagram for explaining a first step for fixing an optical connector to a set block of the attachment.

First, in the first step, the ferrule 11 of the optical connector 1 is inserted into the rectangular hole 220 in the set block 211 as illustrated in FIGS. 7 and 9. In this process, the ferrule 11 is inserted with the end surface 11c directed downward the brim 11a directed upward. In other words, the ferrule 11 is set upside down compared to the one in FIG. 1. Since the ferrule 11 has the brim 11a formed wider than the other portion, and the width of the rectangular hole 220 in the set block 211 is smaller than the width of the brim 11a portion, the brim 11a comes into contact with the upper surface (adjoining surface) of the set block 211 on both sides of the rectangular hole 220 due to gravity, and the ferrule 11 does not further enter the rectangular hole 220.

Figure 10:
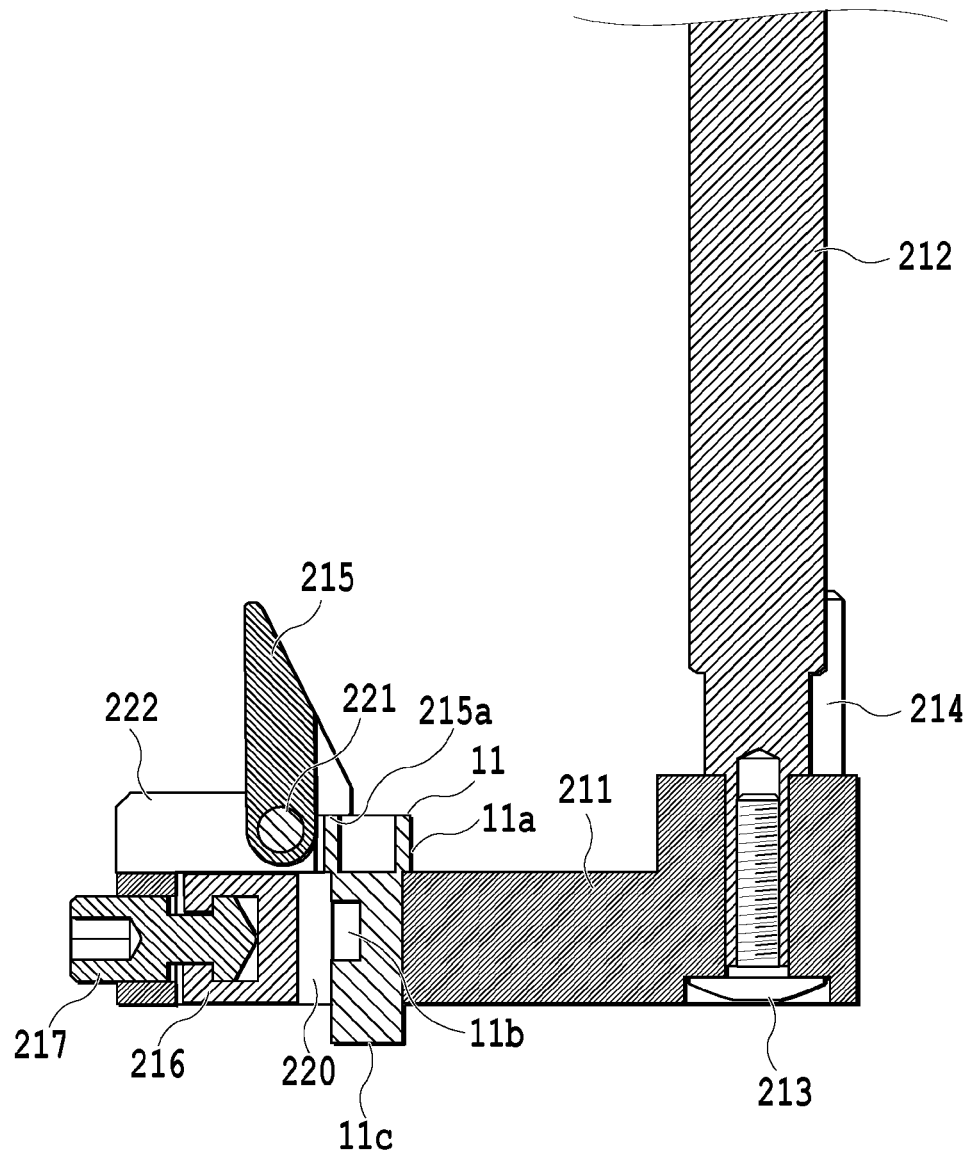
FIG. 10 is a diagram for explaining a second step for fixing the optical connector to the set block of the attachment.

Next, in the second step as illustrated in FIG. 10, the operator rotates and presses the lever 215 so that the pushing end portion 215a pushes the ferrule 11 into the rectangular hole 220, that the upper surface of the brim 11a comes into close contact with the upper surface of the set block 211, and that the ferrule 11 is pressed and fixed. In this state, the ferrule 11 is positioned in the rotation direction around the x-axis (rolling direction: see FIG. 7).

Figure 11:
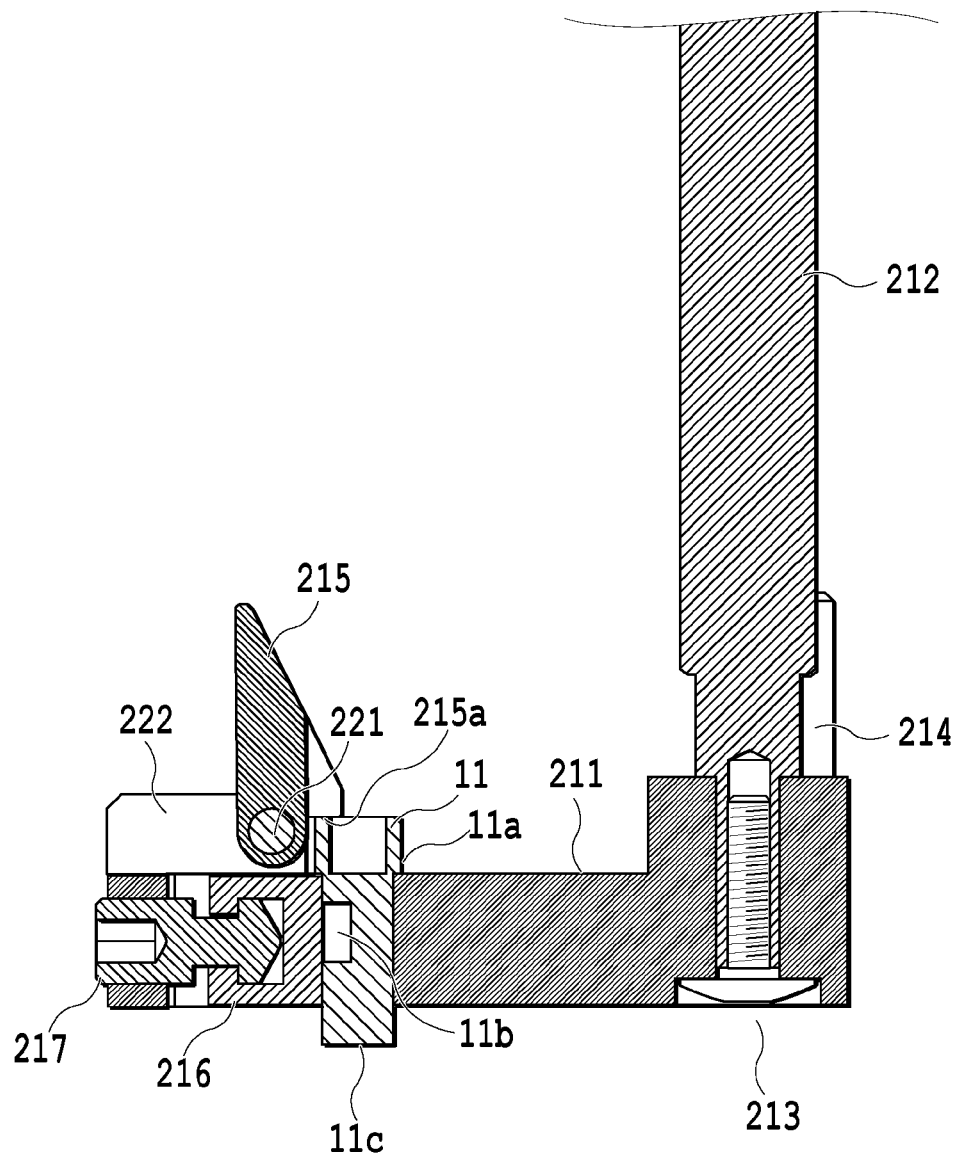
FIG. 11 is a diagram for explaining a third step for fixing the optical connector to the set block of the attachment.

In the third step, the screw 217 connected to the rectangular inner piece 216 is tightened from the state illustrated in FIG. 10, so that the rectangular inner piece 216 is pressed against the ferrule 11. The pressed rectangular inner piece 216 in turns presses the ferrule 11 to the inner wall of the rectangular hole 220 positioned on the far side in the x-axis direction. As a result of the third step, as illustrated in FIGS. 8 and 11, the pressed ferrule 11 is sandwiched between the inner wall of the rectangular hole 220 and the rectangular inner piece 216 and fixed to the set block 211. Since the screw 217 is tighten with the ferrule 11 pushed by the lever 215 as described above, the ferrule 11 is not only pressed and fixed in the state where the ferrule 11 is positioned in the rotation direction around the x-axis (rolling direction: see FIG. 7) but also positioned in the rotation direction around the y-axis (pitching direction: see FIG. 7). As a result, the ferrule 11 is fixed in the rectangular hole 220 in the set block 211 in the state where the ferrule 11 is positioned in both directions: the rotation direction around the x-axis (see FIG. 7) and the rotation direction around the y-axis (see FIG. 7). As shown in a two-dot chain line of FIG. 7, a slope formed on the upper surface of the set block 211 on both sides of the rectangular hole 220 makes it possible to fix the ferrule 11 in a tilted orientation, and adjust the finished tilt angle of the ferrule end-surface 11c.

Figure 12:
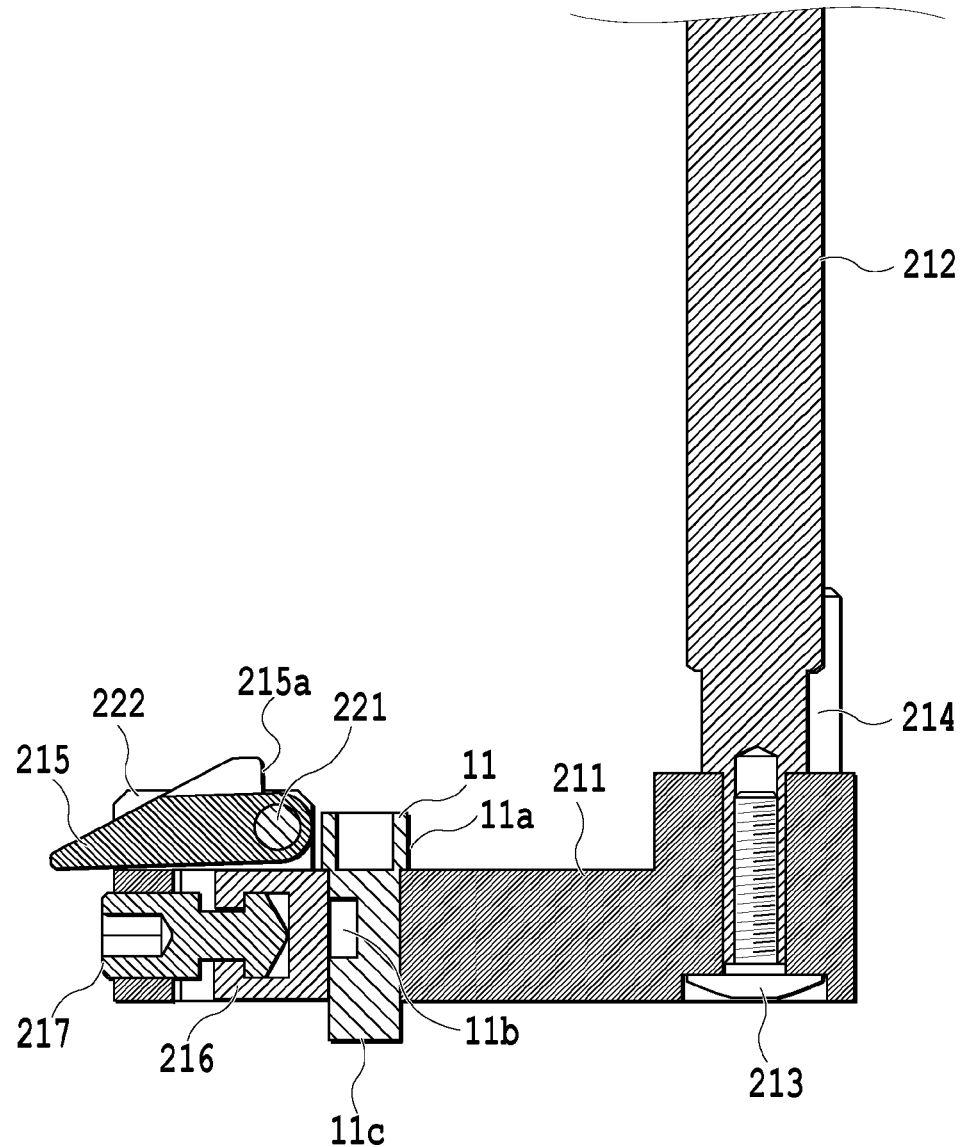
FIG. 12 is a diagram for explaining a fourth step for fixing the optical connector to the set block of the attachment.

After the ferrule 11 is fixed, the lever 215 may be returned to its original position as the fourth step as illustrated in FIG. 12. Thus, the optical connector 1 is fixed at the ferrule 11 to the set block 211 of the attachment 210.

The ferrule 11 is fixed to the set block 211 in the rotation direction around the x-axis (rolling direction) and the rotation direction around the y-axis (pitching direction), and the set block 211 is fixed to the cylinder base 202 also in the rotation direction around the z-axis (yawing direction) by means of the anti-rotation shaft 214 extending from the set block 211. In addition, since the contraction and expansion of the spring 207 allows the cylinder shaft 212 to reciprocate (move up and down in the example illustrated in the diagram) inside the cavity 208 of the cylinder base 202, the force that the end surface of the ferrule 11 fixed to the set block 211 receives from the polishing table 20 is kept constant.

Figure 13A:
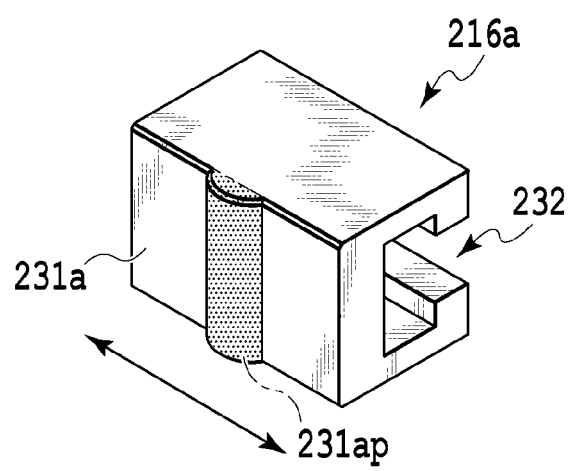
FIG. 13A is a perspective view of the outer appearance of an example of a rectangular inner piece.
Figure 13B:
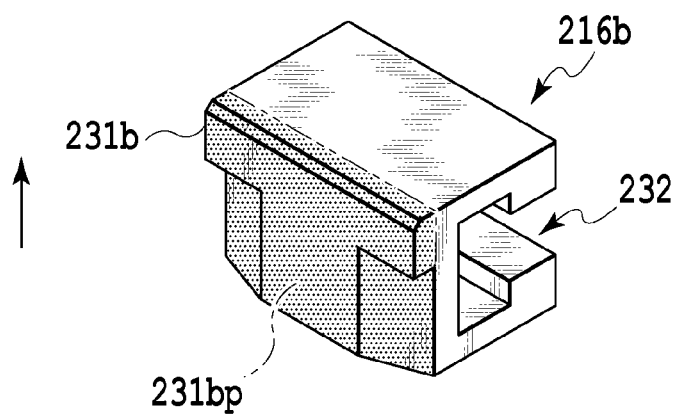
FIG. 13B is a perspective view of the outer appearance of an example of a rectangular inner piece.
Figure 13C:
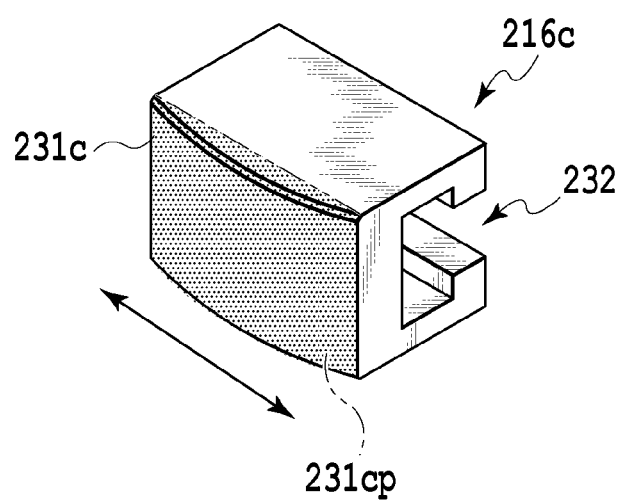
FIG. 13C is a perspective view of the outer appearance of an example of a rectangular inner piece.
Figure 14:
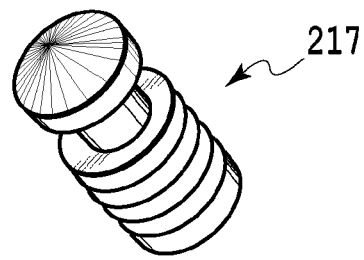
FIG. 14 is a perspective view of the outer appearance of an example of a fixation tool.

FIGS. 13A to 13C each are a perspective view of the outer appearance of an example of a rectangular inner piece for fixing the ferrule 11 to the attachment. FIG. 14 is a perspective view of the outer appearance of the screw 217 for pressing the rectangular inner piece against the ferrule 11 to fix the ferrule 11.

A rectangular inner piece illustrated in FIG. 13A has a ferrule contact surface 231a that comes into contact with a long side surface of the ferrule 11 and a screw receiving portion 232 that receives the screw 217 from the opposite side from the ferrule contact surface 231a. In this specification, a "long side surface of the ferrule 11" means a surface including a long side of the ferrule end-surface, of the four side surfaces of the ferrule 11. Further, in this specification, "the lateral direction of the ferrule contact surface 231a" and "the lateral direction of the long side surface of the ferrule 11" mean the same direction in the state where the ferrule 11 is fixed to the set block 211 in the fourth step, and the direction that those directions mean is the same direction as the longitudinal direction which is approximately the polishing direction. In the rectangular inner piece illustrated in FIG. 13A, the ferrule contact surface 231a has a round shape only in the center portion in the lateral direction (the direction indicated by the double-headed arrow in FIG. 13A), thus, a protrusion 231ap is formed. With this configuration, when the ferrule 11 is fixed, the force is intensively applied only to the center portion in the lateral direction of the long side surface of the ferrule 11.

A rectangular inner piece illustrated in FIG. 13B has a ferrule contact surface 231b that comes into contact with a long side surface of the ferrule 11 and a screw receiving portion 232 that receives the screw 217 from the opposite side from the ferrule contact surface 231b. The rectangular inner piece illustrated in FIG. 13B has a surface protruding in the shape of a letter T in the state where the portion closer to the brim 11a in the longitudinal direction of the ferrule 11 is directed upward (in the direction indicated by the arrow in FIG. 13B). Also with this configuration, when the ferrule 11 is fixed, the pressure is intensively applied only to the center portion in the lateral direction of the long side surface of the ferrule 11. This T-shaped protruding surface is formed flat, thus, a protrusion 231bp is formed. The reason why the protruding surface is formed in the shape of a letter T instead of a letter I in the case where the protruding surface is formed flat is that if it is formed in the shape of a letter I, the center portion in the lateral direction of the long side surface of the ferrule 11 receives an extremely intensified pressure, and that this may break the ferrule 11.

A rectangular inner piece illustrated in FIG. 13C has a ferrule contact surface 231c that comes into contact with a long side surface of the ferrule 11 and a screw receiving portion 232 that receives the screw 217 from the opposite side from the ferrule contact surface 231c. In the rectangular inner piece illustrated in FIG. 13C, the ferrule contact surface 231c has a round shape in whole formed in the lateral direction (the direction indicated by the double-headed arrow in FIG. 13C), thus, a protrusion 231cp is formed. With this configuration, when the ferrule 11 is fixed, the force is intensively applied only to the center portion in the lateral direction of the long side surface of the ferrule 11.

The screw 217 illustrated in FIG. 14 is a screw 217 for fixing the ferrule 11 to the set block 211 by pushing (pressing) the rectangular inner piece 216 (216a, 216b, 216c) against the ferrule 11. The screw 217 has one end having a thread, which is engaged with a thread formed in the set block 211, and the screw 217 is tightened by the engagement. When the screw 217 is tightened, the screw 217 moves pushing the ferrule contact surface 231a, 231b, or 231c of the rectangular inner piece 216 toward a long side surface of the ferrule 11.

Figure 15A:
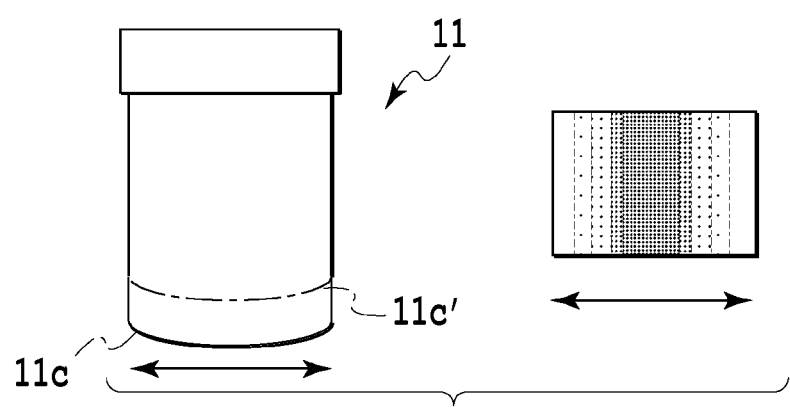
FIG. 15A is a diagram illustrating the state of a ferrule pressed with a rectangular inner piece used in the polishing jig of the present embodiment.
Figure 15B:
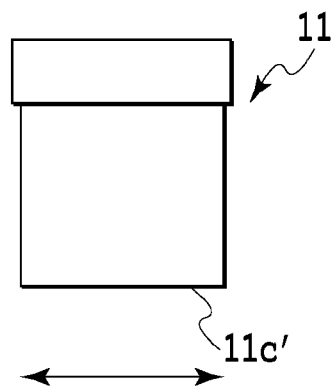
FIG. 15B is a diagram illustrating the state of a ferrule end-surface after being polished with the ferrule held with the rectangular inner piece used in the polishing jig of the present embodiment.
Figure 16:
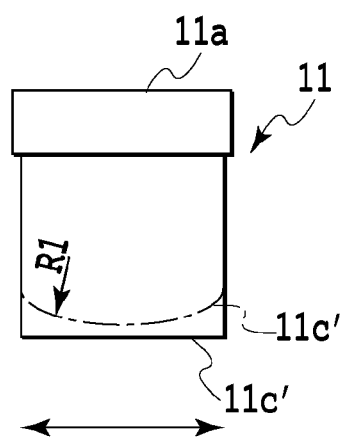
FIG. 16 is a diagram illustrating the state of a ferrule before and after being polished with the ferrule held without pressing.
Figure 17A:
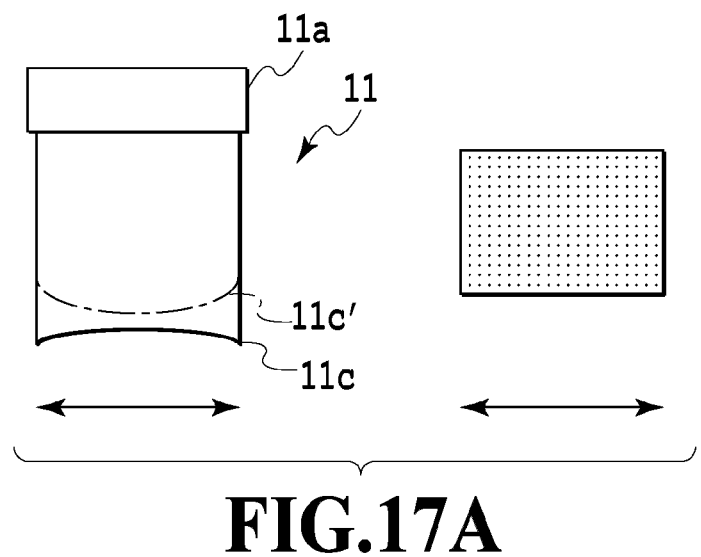
FIG. 17A is a diagram illustrating the state of a ferrule being pressed with a rectangular inner piece used in a conventional polishing jig.
Figure 17B:
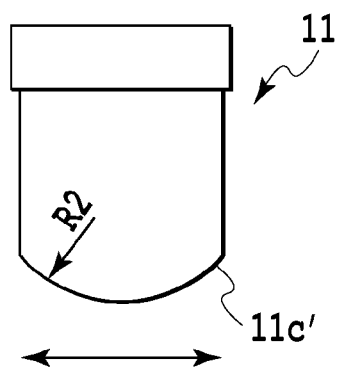
FIG. 17B is a diagram illustrating the state of a ferrule end-surface after being polished with the ferrule held with the rectangular inner piece used in the conventional polishing jig.

FIG. 15A is a diagram illustrating the state of the long side surface of the ferrule 11 before and after polishing is performed with the ferrule pressed by a rectangular inner piece used in the polishing jig of the present embodiment, and FIG. 15B is a diagram illustrating the state of the long side surface of the ferrule 11 after polishing is performed using the polishing jig of the present embodiment, and then the pressing by the rectangular inner piece is cancelled. FIG. 16 is a diagram illustrating the state of the ferrule before and after polishing is performed in the state where the ferrule is held without being pressed, FIG. 17A is a diagram illustrating the state of the long side surface of the ferrule 11 before and after polishing is performed in the state where the long side surface of the ferrule 11 is pressed by a conventional rectangular inner piece, and FIG. 17B is a diagram illustrating the state of the long side surface of the ferrule after polishing is performed using the conventional polishing jig, and the pressing by the rectangular inner piece is cancelled. In FIGS. 15A, 16, and 17A, the position of the ferrule end-surface 11c before polishing is depicted with a solid line, and the position of the ferrule end-surface 11c' after polishing is depicted with a dashed line. The distribution of the pressing force shown as the density of points is illustrated next to the long side surface of the ferrule 11. FIGS. 15A and 17A illustrates the distribution of the pressing force shown as the density of points, next to the long side surface of the ferrule 11.

For the polishing jig of the present embodiment, as illustrated in FIG. 15A, the density of points indicating the pressing force is high in the center portion in the lateral direction (in the longitudinal direction which is the polishing direction) of the long side surface of the ferrule 11. In other words, since the rectangular inner piece 216 (216a, 216b, 216c) according to the present embodiment is thicker in the center portion in the lateral direction than in the other portions, the distribution of the pressure to the ferrule 11 is larger in the center portion in the lateral direction (the direction indicated by the double-headed arrow in FIG. 15A) than in the other portions. The ferrule end-surface 11c, as illustrated in FIG. 15A, is slightly deformed so as to swell in the center portion in the lateral direction (the direction indicated by the double-headed arrow in FIG. 15A) where the pressing force is large. If polishing is performed in such swelling state, the swelled center portion tends to be polished more.

Also in general, in the case where the ferrule end-surface 11c is polished with the polishing table 20 (see FIG. 2), both side portions of the ferrule end-surface 11c in the lateral direction first come into contact with the polishing table 20, and thus, both side portions of the end surface 11c in the lateral direction tend to be polished more than the other portions. For example, in the case where the ferrule end-surface is polished with the ferrule 11 held without pressure to the long side surface, instead of using the polishing jig of the present embodiment, round portions are caused by polishing at both ends of the ferrule end-surface 11c' in the finishing state as illustrated in FIG. 16 (a round shape indicated by R1).

Thus, in the case where the ferrule end-surface 11c is polished with the ferrule 11 pressed with the rectangular inner piece 216 according to the present embodiment, not only the center portion but also both side portions in the lateral direction on the ferrule end-surface 11c can be polished equally. As a result, the ferrule end-surface 11c' can be finished to be flat as illustrated in FIG. 15B.

Meanwhile, for the rectangular inner piece of a conventional polishing jig, the density of points indicating the pressing force is uniform as illustrated in FIG. 17A. Specifically, since the surface of the conventional rectangular inner piece that comes into contact with the ferrule 11 is formed to be flat, the pressing force is uniform also in the lateral direction (the direction indicated by the double-headed arrow in FIG. 17A). In the case where the pressing force to the long side surface of the ferrule 11 is uniform in the lateral direction (the direction indicated by the double-headed arrow in FIG. 15A), both side portions in the lateral direction swell more than the center portion in the ferrule end-surface 11c before polishing, as illustrated in FIG. 17A. Thus, because both side portions of the ferrule end-surface 11c in the lateral direction, which originally tend to be polished more, are made likely to be polished more than the center portion, the ferrule end-surface 11c' after polishing has a round shape indicated by R2 as illustrated in FIG. 17B. This round shape of R2 not only includes not only the round portions at both ends (the round shape of R1) illustrated in FIG. 16 but also includes the amount of deformation added because the ferrule end-surface 11c is deformed such that both side portions swell due to the pressing force (the state where both ends are protruded), the ferrule end-surface 11c is polished to be flat in this state, and after the pressure is cancelled and the deformation disappears, both side portions recess (the state where both ends are recessed).

Thus, the polishing jig of the present embodiment makes it possible to polish the ferrule end-surface 11c flat with high precision, compared to the case where the ferrule 11 is held without pressure to the long side surface or the case where the ferrule 11 is held with a conventional rectangular inner piece.

Although the description in the above embodiment is based on an example in which the cylinder shaft 212 is formed to have a small diameter portion at its upper portion, at which one spring 207 is provided, the present invention is not limited to this example. The configuration only requires that an excess force applied to the set block 211 in the upward direction can be released by the reciprocating movement of the cylinder shaft 212, and that the pressure applied to the end surface of the ferrule 11 is constant.

Although the description in the above embodiment is based on an example in which the shapes of the rectangular hole 220, the rectangular inner piece 216, and the like are rectangular, the present invention is not limited to this example. In addition, although the description is also based on an example in which the cylinder base 202 has a laterally elongated shape be able to receive multiple cylinder shafts, the number of cylinder shafts that can be received and the shape of the cylinder base 202 are not limited to this example. Other constituents are also not limited to the ones in the above embodiment, but it is obvious that those constituents can be of various forms as far as the present invention exhibits its effects.

REFERENCE SIGNS LIST 1 optical connector
11 ferrule
11c connection end surface
11b opening for injecting glue
11a brim
20 polishing table
100 pedestal
101 base
101a mounting surface (reference surface)
110 support mechanism
111 support member
112 guide member
120 driving mechanism
130 support base
131 toggle clamp
132 lever
140 cover
141 operation unit
142 emergency stop switch
200 polishing jig
201 leg portion
202 cylinder base
203 handle
204 fixation plate
205 bolt
206 bolt
207 spring
210 attachment 211 set block
212 cylinder shaft
213 bolt
214 anti-rotation shaft
215 lever
215a pushing end portion
216 rectangular inner piece
216a, 216c, 216c rectangular inner piece
217 screw
220 rectangular hole
221 rotation shaft
222 wall portion
231a, 231b, 231c ferrule contact surface
232 screw receiving portion

The invention claimed is:

1. An optical connector polishing jig that holds an MT ferrule, an end surface of which has a rectangular shape and into which multi-fiber optical fibers are inserted, in a polishing apparatus for polishing the end surface of the MT ferrule of an optical connector that holds the optical fibers that have been inserted into in the MT ferrule in a longitudinal direction of the MT ferrule,
wherein:
the multi-fiber optical fibers are inserted in a longitudinal direction of the MT ferrule,
the optical connector polishing jig comprises fixing means for holding the MT ferrule, and
a surface of the fixing means that comes into contact with the MT ferrule has a protrusion that protrudes to a maximum at a center of a contact surface in a lateral direction and is extended to top and bottom sides of the contact surface in the longitudinal direction to apply a pressing force to the MT ferrule such that when the MT ferrule is fixed, the end surface of the MT ferrule is slightly deformed and a center portion of the end surface in the longitudinal direction of the rectangular shape swells, wherein the protrusion is positioned in the contact surface such that the pressing force is greater in a middle portion of the MT ferrule in the lateral direction than at sides of the MT ferrule in the lateral direction and wherein the longitudinal direction is transverse to the lateral direction.

2. The optical connector polishing jig according to claim 1, wherein:
the fixing means includes an opening into which the MT ferrule is inserted, an inner piece fitted in the opening to be adjacent to the MT ferrule, and a screw that presses the inner piece against the MT ferrule for adjusting the pressing force.

3. The optical connector polishing jig according to claim 2, wherein:
the protrusion formed on a surface of the inner piece that comes into contact with the MT ferrule has any of a center round shape in which only a portion along the center portion protrudes to form a round shape, a T-shape in which a surface protrudes to form the shape of a letter T, and a round shape in which a round shape is formed in whole, such that the pressure applied to a portion along the center portion is larger than the pressure applied to the other portions.

4. The optical connector polishing jig according to claim 2, wherein:
the fixing means includes a lever for pressing a brim of the MT ferrule to an adjoining surface of the opening when the inner piece is pressed to fix the MT ferrule.

5. The optical connector polishing jig according to claim 4, wherein:
the adjoining surface of the opening with which the brim of the MT ferrule comes into contact is tilted according to a finished tilt angle of the end surface of the MT ferrule.

6. The optical connector polishing jig according to claim 1, wherein:
the polishing apparatus polishes the optical connector by driving a polishing table to move the polishing table along guide members so that the polishing table horizontally moves relative to the end surface of the MT ferrule,
the optical connector polishing jig further comprises a housing and a shaft held by the housing such that the shaft is capable of reciprocating and having one end connected to the fixing means,
the housing has a cavity receiving the shaft and a spring that expands and contracts along the shaft, and
the shaft reciprocates such that in a case where a force that the MT ferrule fixed to the fixing means receives from the polishing table becomes greater than or equal to a certain force, the spring contracts and the shaft moves in a direction toward the housing, and in a case where the force that the MT ferrule fixed to the fixing means receives from the polishing table becomes smaller than the certain force, the spring expands and the shaft moves in a direction away from the housing to a fixed position.

7. The optical connector polishing jig according to claim 6, wherein:
the optical connector polishing jig further comprises an anti-rotation shaft that is provided on the fixing means to be adjacent to the shaft and to extend in the same direction as the shaft extends and is fitted into the housing.

* * * * *